May 6, 1941.  K. A. OESTERHELD  2,240,570
SYSTEM FOR FREEING MOTOR VEHICLES
Filed Oct. 12, 1938
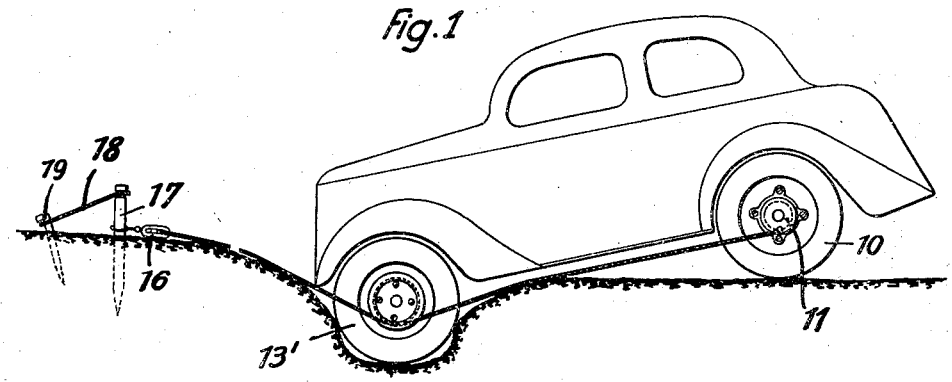
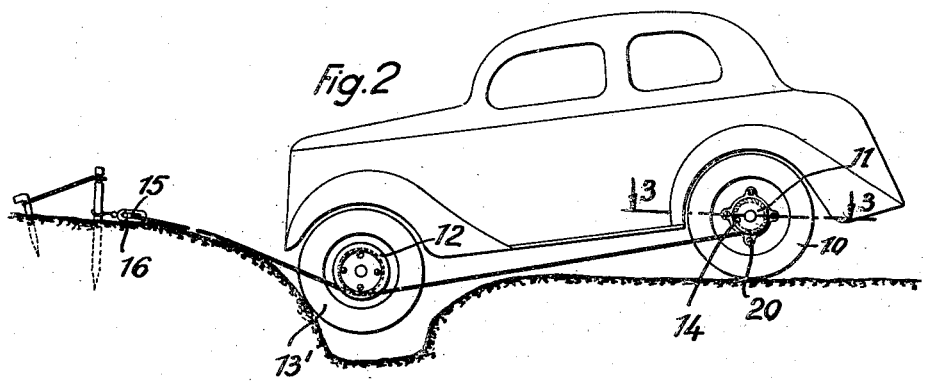
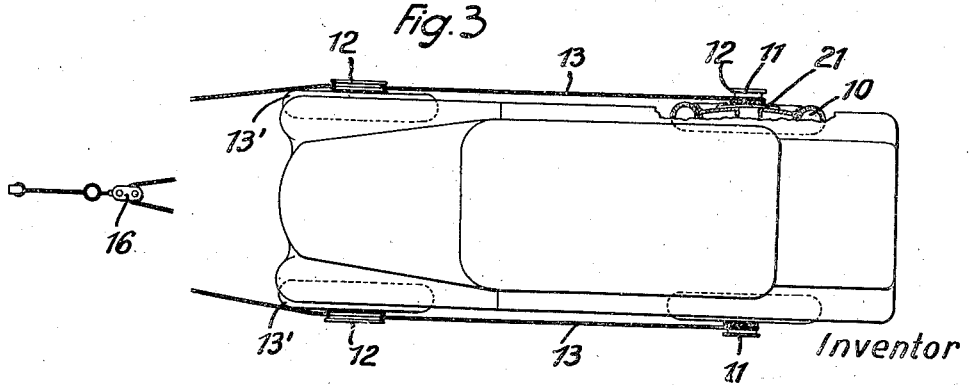
Inventor
KARL A. OESTERHELD
By Lackenbach & Hirschman
Attorneys Patented May 6, 1941

2,240,570

UNITED STATES PATENT OFFICE 2,240,570

SYSTEM FOR FREEING MOTOR VEHICLES

Karl Adolf Oesterheld, Eichriede, near Wunstorf, Germany

Application October 12, 1938, Serial No. 234,703
In Germany October 15, 1937

3 Claims. (Cl. 254—166)

My invention relates to a system for freeing motor-vehicle when stuck, and, more particularly for pulling the front wheels thereof out of ditches, mud holes or the like and to simultaneously propel the vehicle forward. When a motor-vehicle is sunk into sandy or soft soil or gets stuck in impassable country preventing the driven wheels from gripping, it presents considerable difficulties, to free the vehicle out of its position. For this purpose, it has been proposed prior to my invention to attach, to the outside of the driven wheels, cable drums from which cables are extended to a stationary point, for instance to a post to be rammed into the soil. When the vehicle is then put in operation, the cables are wound up on the cable drums with considerable force and are brought to such a condition of tautness that they will pull the vehicle towards the stationary point out of the ditch or hole.

This remedy fails, however, in case the vehicle is deeply sunk in with its front wheels and is to be pulled out in forward direction. It is the object of my invention to solve this problem. Prior to my invention, it has been proposed to extend the cables from the cable drums mounted on the driven rear wheels to a fixed point in front of the vehicle, the cables passing through slots of sleeves mounted on the hubs of the front wheels. This is disclosed in the Patent No. 1,340,349 to Snideman, of May 18, 1920. In this arrangement, however, the cables are guided on the hubs of the front wheels so as to extend above the centre lines thereof. While this arrangement permits the vehicle to be pulled out forwardly, if it should get caught with its rear wheels in a ditch, as may happen when turning, it is neither intended nor adapted to solve the above explained problem. In order to free the vehicle, when the non-driven front wheels are deeply sunk in, it is an indispensable requirement that these front wheels be efficiently lifted, as otherwise any propelling force exerted on the vehicle will only tend to drive the front wheels deeper into the mud.

I have found a very simple and effective solution permitting the vehicle to be pulled out forwardly, even should the front wheels be sunk in very deeply. I extend the cables from the drums attached to the rear wheels to a stationary point, in front of the vehicle, passing the cables beneath and around sheaves attached to the front wheels. When the vehicle is then started, the cables are wound up on the drums of the driven rear wheels and are thus made taut thereby lifting the front wheels out of the ditch or hole, acting at the same time as rails on which the sheaves attached to the front wheels are running obliquely upwards out of the ditch. My invention affords a valuable possibility, particularly for army vehicles, of traversing ditches with an ordinary vehicle without outside help.

A preferred embodiment of my invention is illustrated in the accompanying drawing in which Fig. 1 shows an automobile in the position in which the front wheels are deeply sunk into a ditch, with the cable attached and laid out ready for operation, Fig. 2 shows the vehicle during the pulling out operation, Fig. 3 is a plan view, partly in section along line 3—3 of Fig. 2.

A cable drum 11 is attached to the outside of each of the driven rear wheels 10 and projects laterally beyond the plane of the tire. This drum is provided with an outer flange 12 and with suitable means for the attachment and ready detachment of a cable 13. These means may comprise, for instance, a hole 14 provided in the flange 12 and adapted to be engaged by a hook fastened to the end of the cable 13.

To the front wheels 13' of the vehicle, I attach sheaves 12 which preferably have a larger diameter than the drums 11 and are provided with a peripheral groove. Preferably, the cables 13 are the ends of a single continuous cable which runs over a roll 15, suitably attached at a stationary point in front of the vehicle at a suitable distance therefrom. For this purpose a block 16 carrying the roll 15 may be anchored to a tree or the like. However, I use a known anchoring mechanism which is illustrated in the drawing and comprises a post 17 rammed into the soil and having its upper end connected by an auxiliary cable 18 with a second post 19.

In order to pull the vehicle forwardly out of the ditch—this is the problem of my invention— I first place the hooks provided at the two ends of the cable 13 into the holes 14 of the drums 11. This having been done, I lay out the cables in such a way that they engage the grooves of the sheaves 12 from below and position the block 16 at a point in front of the vehicle within the longitudinal central vertical plane thereof. Then I ram in the two posts 17 and 19 and attach the block 16 to the post 17. These operations require but a few minutes. Then I get into the car and start it.

As the front wheels 13' are firmly seated in the ditch, the rear wheels will first skid thus winding up the cable ends 13 on the drums 11 with a considerable force which, owing to the comparatively small diameter of the drums 11, is many times higher than the maximum propelling force of the rear wheels under ordinary driving conditions. In this way the cables 13 are made taut and thereby lift the front wheels out of the ditch as shown in Fig. 2. At the same time the cables 13 act as rails on which the sheaves 12 run forwardly and upwardly.

Thus, it will be readily appreciated that the cables serve the dual function of lifting the front wheels and of acting as rails therefor. This is an important feature of my invention.

After the front wheels have left the ditch it will be an easy matter to traverse the ditch with the rear wheels 10. If necessary, the cables 13 may be used for this purpose in a known manner which does not form subject matter of my invention.

Experience has shown that it does not take the driver more than three minutes to attach the cable to the drums, to lay out the cable and to attach the same by means of the anchoring mechanism. Therefore, my invention permits the driver to free the vehicle within a very short time without outside help.

The manner in which the cable drums are attached depends on the specific type of the vehicle. When the invention is applied to trucks, the appearance of which is of little importance, it is preferable to leave the drums permanently attached to the wheels, whereas I prefer a detachable attachment of the drums, when applied to passenger cars.

This detachable attachment is particularly simple, if the bolts 20 serving to detachably fasten the wheel to the hub are used at the same time for the attachment of the cable drum and, for this purpose, extend through holes provided in the inner flange 21 of the drum placed on the wheel.

In lieu of a single cable running past the equalizing roll 15, two outlets may be employed and attached to separate points. Instead of cables, chains or other pulling elements may be used.

While I described my invention by reference to a specific embodiment thereof I wish it to be understood that it is capable of numerous modifications within the scope of the appended claims.

What I claim is:

1. In a system for pulling the front wheels of a motor driven vehicle out of ditches, mud holes or the like, the combination comprising a motor-vehicle having front wheels and driven rear wheels, a cable drum attached to each of said rear wheels, a sheave attached to each of said front wheels and rotatable therewith, an anchor located at a distance from and in front of the vehicle, and a cable attached to each of said drums and extending therefrom in a line substantially coincidental with a horizontal line between each set of front and rear wheels, towards said sheave and beneath the same to said anchor, whereby said cable will be made taut upon operation of said drum, serving the dual function of lifting the front wheel and acting as a rail for the forward propulsion thereof.

2. In a system for pulling the front wheels of a motor driven vehicle out of ditches, mud holes or the like, the combination comprising a motor-vehicle having front wheels and driven rear wheels, a cable drum attached to each of said rear wheels, a sheave attached to each of said front wheels rotatable therewith and having a larger diameter than said drum, an anchor located at a distance from and in front of the vehicle, and a cable attached to each of said drums and extending therefrom in a line substantially coincidental with a horizontal line between each set of front and rear wheels, towards said sheave and beneath the same to said anchor, whereby said cable will be made taut upon operation of said drum serving the dual function of lifting the front wheel and acting as a rail for the forward propulsion thereof.

3. In a system for pulling the front wheels of a motor driven vehicle out of ditches, mud holes or the like, the combination comprising a motor vehicle having front wheels and driven rear wheels, bolts for detachably securing said rear wheels, a cable drum attached to each of said rear wheels by said bolts, a sheave attached to each of said front wheels and rotatable therewith, an anchor located at a distance from and in front of the vehicle, and a cable attached to each of said drums and extending therefrom in a line substantially coincidental with a horizontal line between each set of front and rear wheels, towards said sheave and beneath the same straight to said anchor, being connected thereto, whereby said cable will be made taut upon operation of said drum, serving the dual function of lifting the front wheel and acting as a rail for the forward propulsion thereof.

KARL ADOLF OESTERHELD.